US012798655B2

(12) United States Patent
Cockerel et al.

(10) Patent No.: US 12,798,655 B2
(45) Date of Patent: Nov. 17, 2026

(54) VEHICLE BRAKE

(71) Applicants: Jeff Cockerel, Clay City, IL (US); Eben Abshire, Palisade, CO (US)

(72) Inventors: Jeff Cockerel, Clay City, IL (US); Eben Abshire, Palisade, CO (US)

( * ) Notice: Subject to any disclaimer, the term of this patent is extended or adjusted under 35 U.S.C. 154(b) by 412 days.

(21) Appl. No.: 18/236,727

(22) Filed: Aug. 22, 2023

(65) Prior Publication Data

US 2024/0067253 A1 Feb. 29, 2024

Related U.S. Application Data

(60) Provisional application No. 63/400,142, filed on Aug. 23, 2022.

(51) Int. Cl.
*B62B 17/00* (2006.01)

(52) U.S. Cl.
CPC .................................. *B62B 17/005* (2013.01)

(58) Field of Classification Search
CPC .................................................... B62B 17/005
USPC ............ 180/273, 272; 188/72.1, 72.9, 106 F, 188/106 P, 171, 173; 303/114.1
See application file for complete search history.

(56) References Cited

U.S. PATENT DOCUMENTS 3,561,573 A * 2/1971 Laird, Jr. ................ F16D 65/74 91/170 R
4,042,077 A * 8/1977 McCarthy ............... F16D 55/28 188/72.3
4,611,691 A * 9/1986 Gornall ................... F16D 65/22 188/79.62
5,701,977 A 12/1997 Vrevich
8,651,589 B2 2/2014 Ishikawa et al.
10,099,666 B2 * 10/2018 Miura ....................... B60T 8/17
10,414,386 B2 9/2019 Natoli et al.
2007/0273200 A1 * 11/2007 Pongo ....................... B62L 3/08 303/9.61
2013/0221737 A1 * 8/2013 Richard ................ B60T 8/4077 303/119.1
2025/0269943 A1 * 8/2025 Trotter .................... B63B 79/10

FOREIGN PATENT DOCUMENTS

JP 2011017272 A 1/2011
JP 2011115079 A 6/2011
JP 5831073 B2 12/2015

* cited by examiner

*Primary Examiner* — Christopher P Schwartz

(74) *Attorney, Agent, or Firm* — Lowe Graham Jones PLLC

(57) ABSTRACT

A vehicle brake actuated to stop a vehicle drive system upon separation of the rider from the vehicle by a threshold distance and/or upon power being cut to the vehicle ignition. Thus, the proximity device is sensitive to the proximity of a rider to the vehicle. The brake includes an actuator and a switch. The brake actuator applies a braking force to a vehicle drive member. The proximity device triggers the switch to provide an activation signal to the brake actuator upon a determination of crossing a pre-set proximity threshold. Stoppage of engine ignition may also activate the brake.

15 Claims, 9 Drawing Sheets

VEHICLE BRAKE

PRIORITY CLAIM

The present application is a non-provisional utility application of U.S. Provisional Application Ser. No. 63/400,142, entitled RIDER SEPARATION BRAKE, filed Aug. 23, 2022, in which the contents are hereby incorporated by reference.

FIELD OF THE INVENTION

The present invention is directed to brakes for vehicles and, in particular, for brakes for straddle-mount vehicles in which a rider might be separated from the vehicle riding position.

BACKGROUND OF THE INVENTION

Snowmobiles and all-terrain vehicles (ATVs) are good examples of vehicles ridden by riders without rider retention to the vehicle. Thus, the rider might be separated from the riding position on the vehicle in a vehicle crash or other upset. Some such vehicles include tethers securable between the rider and the vehicle that interrupts the vehicle power/ignition when the separation distance exceeds the tether length such that the tether is removed interrupting the circuit. This function, however, does not apply any braking force to the vehicle drive system.

In a fall off a snowmobile, for example, the snowmobile may continue to coast forward even if the power is interrupted. This may be the case especially with a two-stroke engine in which compression braking is minimal. It may also be the case with a continuously variable transmission (CVT) in which the drive belt disengages at lower clutch speeds to allow the vehicle to coast without engine braking.

SUMMARY OF THE INVENTION

The present disclosure includes a vehicle brake actuated to stop a vehicle drive system upon separation of the rider from the vehicle by a threshold distance and/or upon power being cut to the vehicle ignition. Thus, the proximity device is sensitive to the proximity of a rider to the vehicle. The brake includes an actuator and a switch. The brake actuator applies a braking force to a vehicle drive member. The proximity device triggers the switch to provide an activation signal to the brake actuator upon a determination of crossing a pre-set proximity threshold.

In one embodiment, the system includes a master cylinder, a brake caliper with a slave cylinder, a brake pad, a brake rotor, and an actuation solenoid. The brake master cylinder holds brake fluid. The brake slave cylinder drives the brake pad. The solenoid is the brake actuator and is coupled to the brake master cylinder, specifically to the plunger in the master cylinder to apply pressure to the brake fluid.

In one preferred embodiment, a spring is coupled to a rod of the solenoid for biasing the rod into the master cylinder. Power applied to the solenoid resists the spring bias. When power is cut off, the spring moves the rod to push the plunger. A lever may be coupled between the solenoid and the plunger to increase the force applied to the plunger by the solenoid. An adjustment member, such as a threaded nut, may be provided on the rod for adjusting a preload on the spring. The power supplied to the solenoid may be from a battery, a capacitor, or from an engine stator, generator, or alternator.

The brake system of the present disclosure may be tied into the user-operated master/slave brake system. The user operates a brake lever to apply pressure to the system to pressure the brake pad against the brake rotor. An in-line master cylinder in fluid communication with the brake line may be provided. The in-line master cylinder includes a plunger to apply pressure to the brake fluid. The brake actuator is coupled to drive the plunger.

In at least one embodiment the brake actuator is positioned proximate to the friction brake member. The brake actuator in such embodiment may be a solenoid coupled to a plunger in the slave cylinder to apply pressure between the brake pad and the rotor. Alternatively, the solenoid may apply a force to the brake caliper independent of the brake fluid master/slave system.

The proximity device may be a physical tether for coupling between the rider and the vehicle. Alternatively, it may comprise a proximity sensor measuring the distance between the vehicle and a rider.

In some embodiments, the brake actuator comprises a screw drive coupled to a plunger of a brake fluid cylinder.

An automatic brake for a vehicle having an internal combustion engine may be actuated upon stoppage of the ignition of the engine. A switch provides an activation signal to the brake actuator upon stoppage of engine ignition whereupon a brake actuator applies a braking force to a vehicle drive member. This same system may also be applied upon the event of a rider being separated from the vehicle by a pre-determined distance. The automatic brake may have an activation mechanism separate from the user-operated brake.

DETAILED DESCRIPTION

The present disclosure relates to a vehicle brake to slow and/or stop a vehicle when the rider is separated from the vehicle. This may be useful, for example, with a straddle-type vehicle (e.g., snowmobiles, ATVs, trikes (two wheels in front or two in rear), and even motorcycles) that may continue to run or at least coast along even after a rider has fallen off the vehicle. A snowmobile, for example, may even increase speed after rider separation if it is running downhill.

Current rider separation systems simply stop the ignition on a vehicle with an internal combustion engine, which might slow the vehicle. Vehicle slowing based on engine braking (i.e., engine compression braking) is less in many instances of two-stroke motors or in four-stroke motors with compression bypass systems. Thus, more aggressive braking would be helpful in most situations in which the rider is separated from the vehicle. The system of the present disclosure applies a braking force to the drive system of the vehicle rather than simply relying on engine braking alone.

Figure 1:
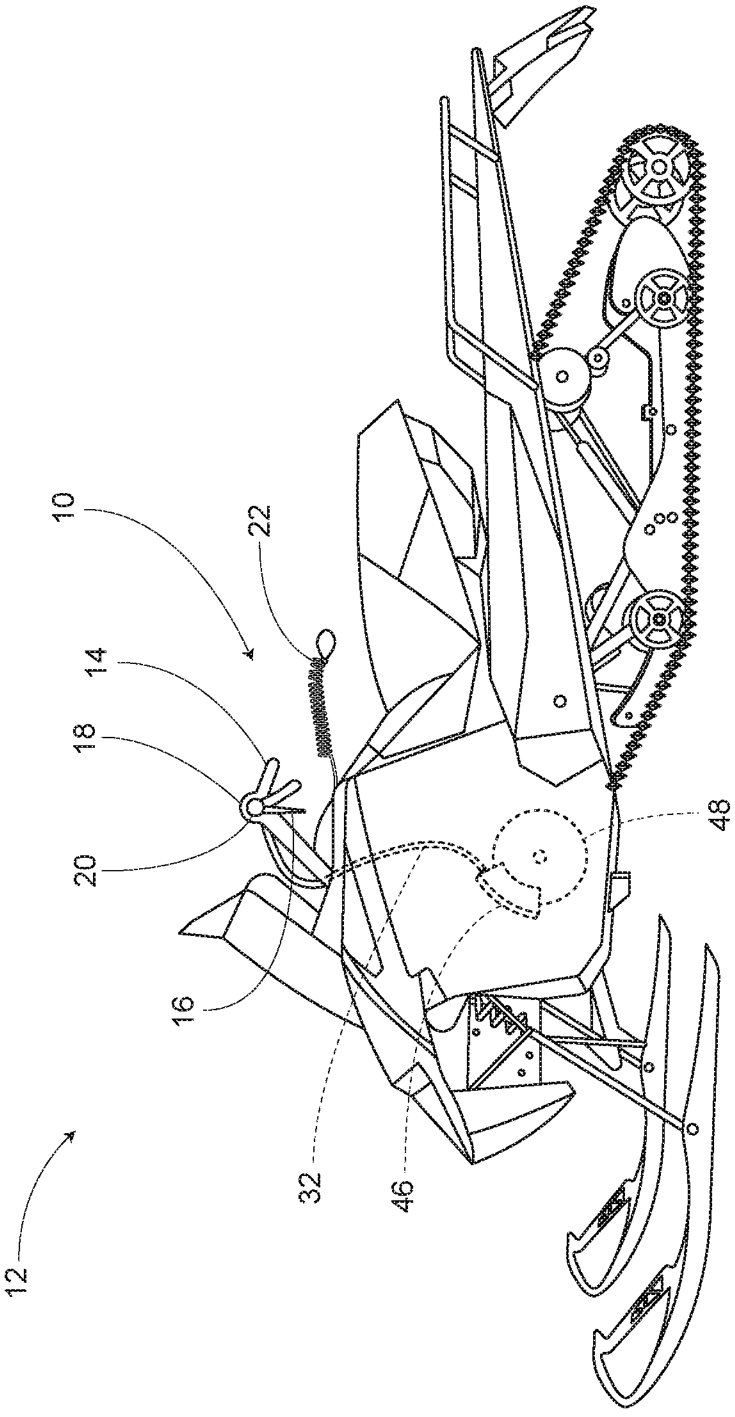
FIG. 1 is a side-elevational view of a snowmobile with a braking system.

In the basic arrangement shown in FIG. 1, a braking system 10 is integrated into a vehicle 12 such as a snowmobile. The vehicle used in this preferred example includes handlebars 14 with a user-operated brake lever 16 secured thereto. The brake lever 16 is coupled to a brake master cylinder 18 for pressuring brake fluid in the brake system 10. In the present disclosure, an actuator, such as a solenoid 20, is fluidly coupled to master cylinder 18. Solenoid 20 is configured to apply pressure to the brake system 10 to apply vehicle brakes upon rider separation from the vehicle. The solenoid 20 is actuated when a tether 22 is pulled from its base, tripping a switch that either cuts the power to solenoid 20 allowing a spring to apply pressure within a master cylinder 18 or applying power such that the solenoid 20 applies pressure within a brake master cylinder 18. The fluid pressure applies pressure to a brake caliper 46 (through pressure by a slave cylinder also at 46) pushing it into friction engagement with a brake disc 48 that is coupled to the track drive system of the snowmobile 12.

Figure 2:
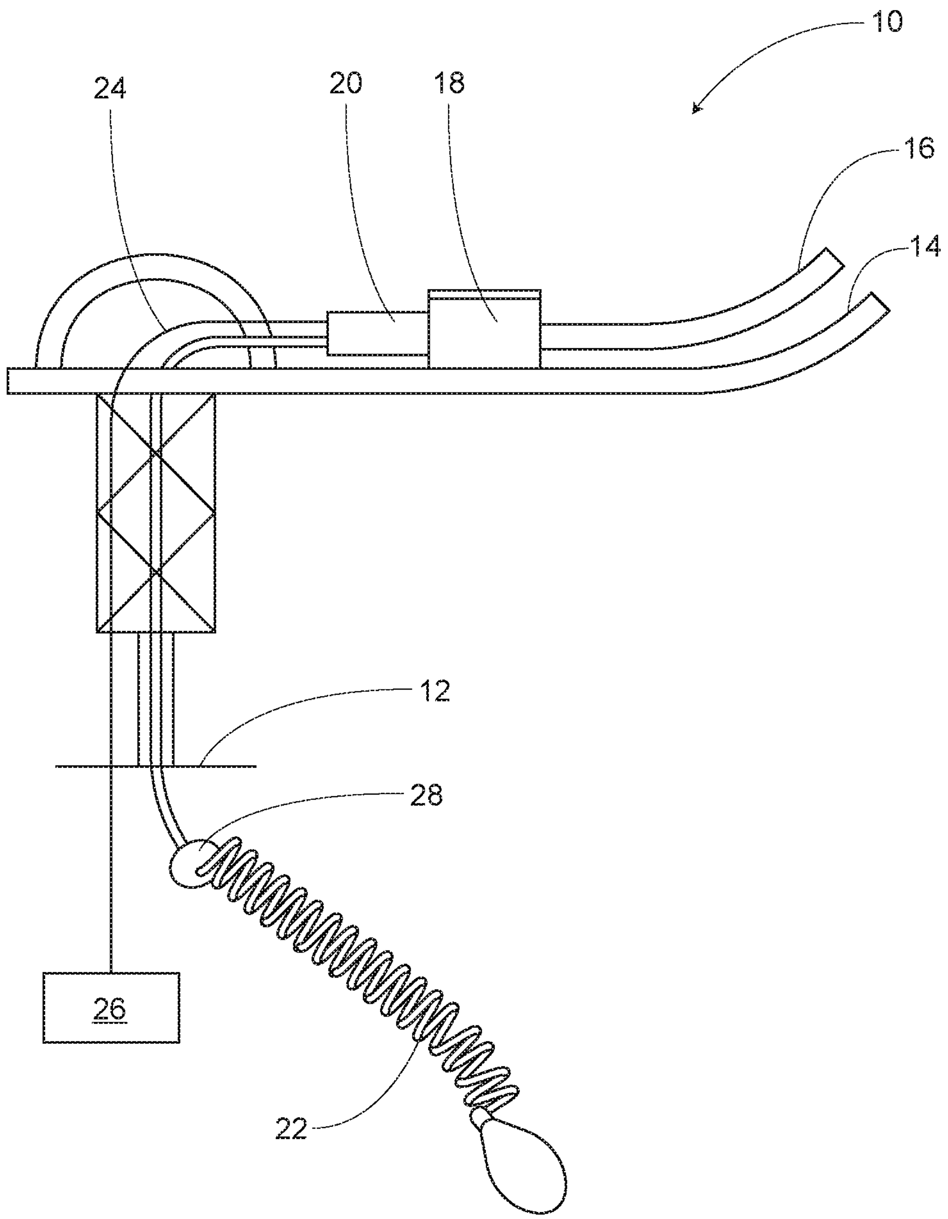
FIG. 2 is a schematic view of a vehicle braking system.

FIG. 2 schematically illustrates the details of an embodiment with the solenoid 20 secured to and fluidly communicating with the main master cylinder 18 (might not be cylindrically shaped) on the handlebar 14 of the vehicle 12. The solenoid includes a power supply 24 to actuate a plunger therein, as set forth below. The solenoid 20 is powered on with a switch 28 that is activated by the tether 22. The tether 22 actuates the switch 28 when it is pulled from the vehicle 12 by a set rider separation distance from the vehicle 12. In the preferred embodiment, the tether 22 is a physical cord with a magnet at the end similar to an ignition tether. In fact, the same tether 22 may be used. In other embodiments, the tether can be a proximity sensor on the vehicle and on the rider set to a predetermined distance to trigger the switch 28.

A power supply 24 to the solenoid 20 is preferably supplied by a battery and/or capacitor 26 electrically coupled to the solenoid 20 as schematically shown in FIG. 2.

As noted above, the solenoid 20 is coupled to the master cylinder 18 of a hydraulic brake system 10. The solenoid 20 may be built into the master cylinder, secured to the side thereof, or otherwise, fluidly coupled thereto. The solenoid 20 is actuated when the tether 22, clipped to the rider, is pulled from the vehicle 12. Removing the tether 22 connection activates switch 28 to power the solenoid 20 to compress fluid in the master cylinder 18. The brake caliper 46 is thus actuated from the same brake fluid used in a standard system. Thus, few additional parts and systems are needed.

Figure 3:
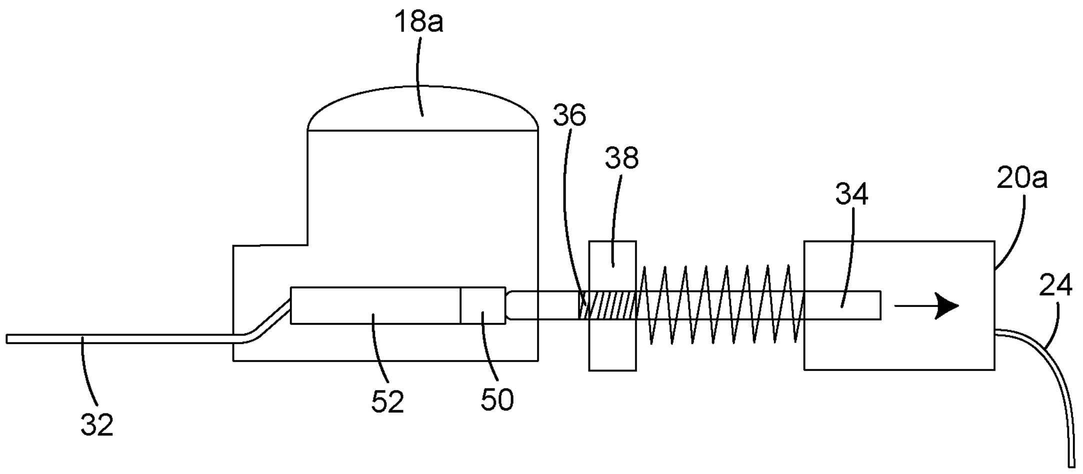
FIG. 3 is a schematic view of another vehicle braking system.

In other embodiments a spring 30 biases a plunger 50 that works within a cylinder 52 of the master cylinder 18*a* to pressure the brake fluid. See FIG. 3. The solenoid 20*a* holds the plunger 50 from compressing the fluid in the cylinder 52 while power is sent to the solenoid such as while the engine is running. Thus, when the power to the solenoid 20 is removed, such as when the engine dies due to the tether 22 being pulled, the spring 30 forces the plunger into the master cylinder 18*a* to actuate the brakes through the brake lines 32. Adjustment of the spring pressure is available using a knurled adjustment nut 38 secured on a threaded portion of the shaft or rod 36 that extends to the plunger in the master cylinder 18*a*.

This embodiment does not require the use of a battery or other power source, such as a capacitor, other than the motor and stator power from the engine. Thus, when the engine stops the power from the stator or other alternator/generator stops such that the spring bias is no longer resisted by the solenoid 18*a*, such that the spring activates the plunger to apply the braking force with fluid pressure to the caliper 46.

Besides the brake being actuated in the situation in which the rider falls from the vehicle, this embodiment automatically applies a parking brake to the vehicle when the engine is turned off. In this embodiment of an automatic braking system, a bypass mechanism can be used to release the brake even when the engine is not running, such as for towing a disabled vehicle, etc. This system also works well with a different actuation trigger rather than the tether. Thus, a key fob or bluetooth system with a mobile phone could be used as a proximity sensor to interrupt the 12 volt signal to the solenoid.

Figure 4:
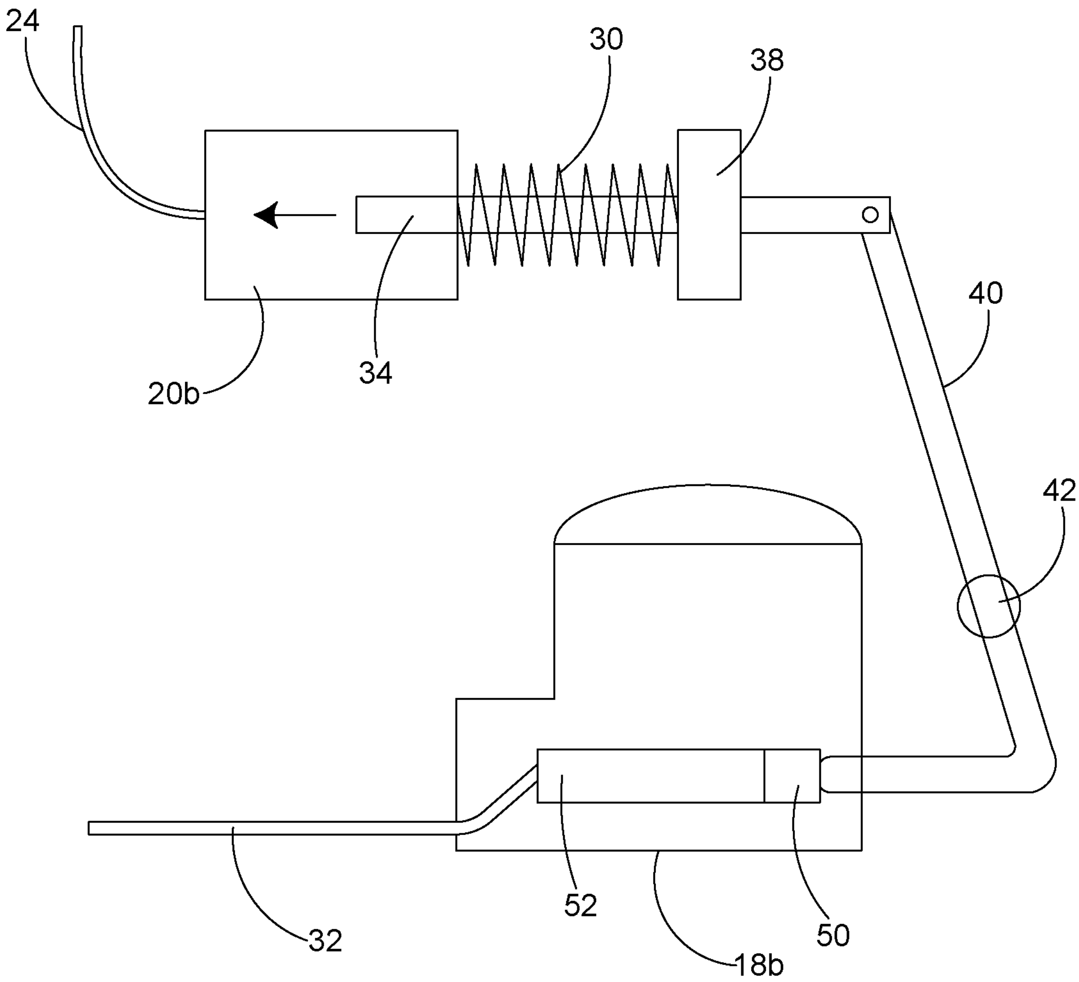
FIG. 4 is a schematic view of a vehicle braking system with a lever.

In a slightly modified embodiment, a lever 40 may be introduced into the system to apply additional braking force, as shown below in FIG. 4. Thus, resulting in a lower power requirement for the solenoid 20*b*. The movement of the rod 34 is slightly increased with a pivot (lever fulcrum) more than half way between the rod 34 and the solenoid plunger 50 pressing into the cylinder 52 of master cylinder 18*b*. The pivot is fixed relative to the master cylinder 18*b* and the solenoid body.

Figure 5:
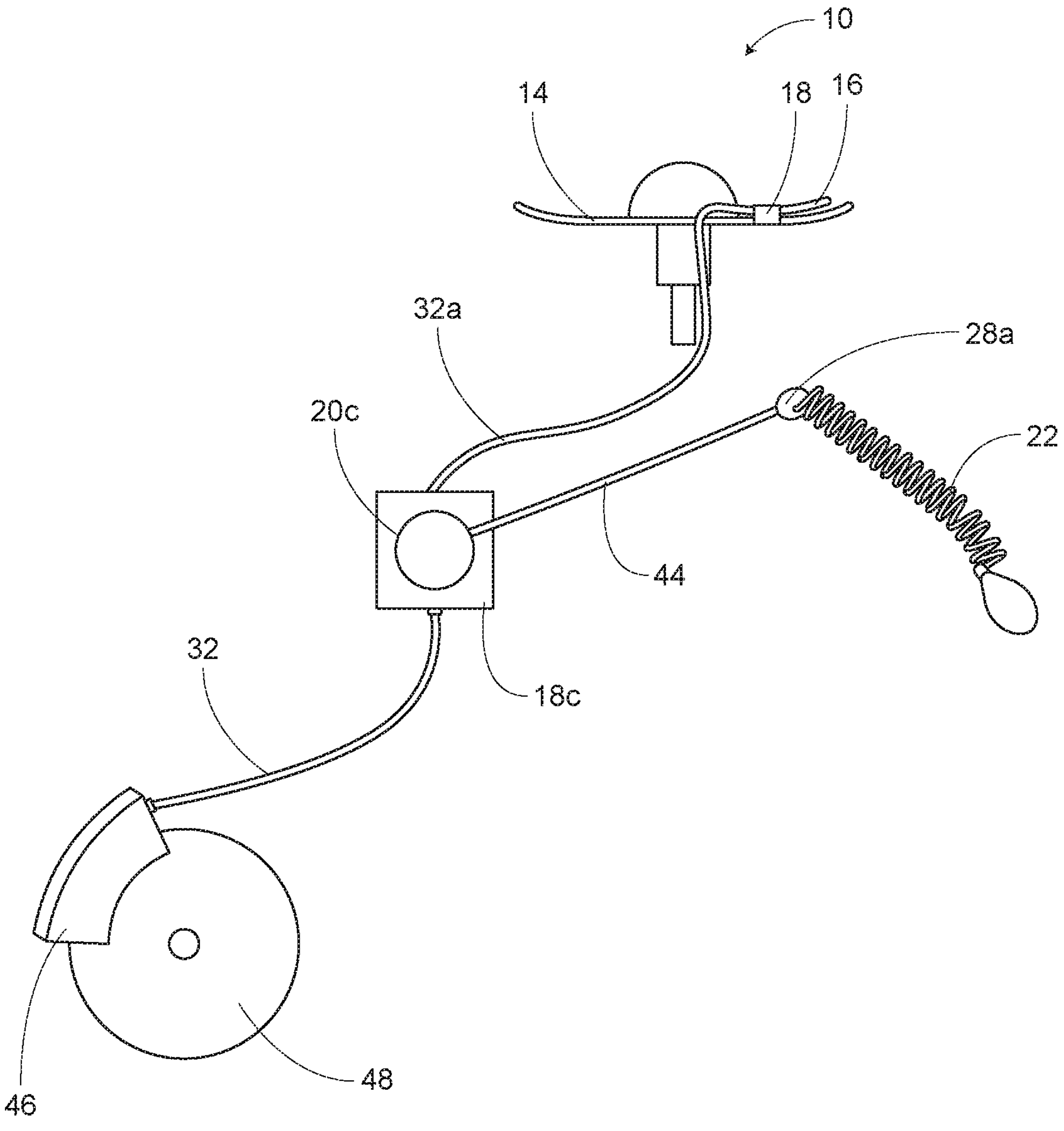
FIG. 5 is a schematic view of a vehicle braking system with intermediate actuation.

In the embodiment shown in FIG. 5, an in-line master cylinder 18*c* and solenoid 20*c* are used at a midpoint in the brake line 32*a* to apply the braking force through either of the systems discussed above—the simple solenoid system or the opposite spring-biased system. A primary master cylinder 18 is used at the handlebar 14, actuated by the brake lever 16. The brake line 32*a* communicates brake fluid to the in-line master cylinder 18*c* that includes the plunger of the solenoid 20*c* to apply brake pressure when the solenoid is triggered on (or off depending on the system). A one-way valve is used to avoid the pressure being transmitted back to the primary handlebar master cylinder 18. The main brake line 32 extends from the in-line master cylinder 18*c* to the brake caliper 46 to apply a force to the brake disc 48.

Note also in this embodiment, as in others, the tether 22 is coupled to a tether switch 28*a* with tether electrical connection 44 then extending to interrupt power to the solenoid. While not shown in this particular view of FIG. 5, a power supply (battery, capacitor, etc.) is also electrically coupled to solenoid 20*c*.

Figure 6:
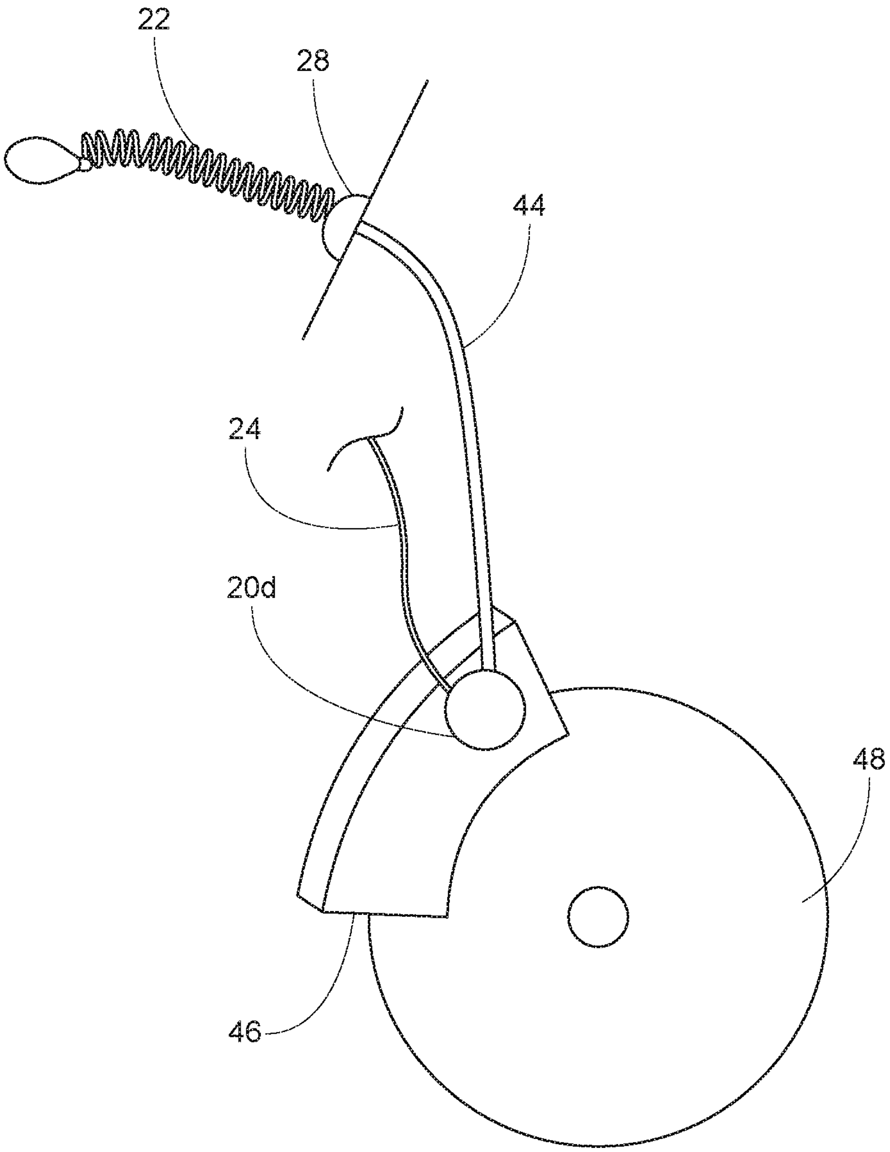
FIG. 6 is a schematic view of a vehicle braking system with actuation at the caliper.

As shown in FIG. 6, a solenoid 20*d* may be used with or without a master cylinder to press directly on (or through a linkage, lever, or master/slave brake fluid cylinder) a brake caliper 46. This embodiment is independent of the standard brake system of the vehicle. The system includes a tether 22 coupled to a switch 28 that opens and closes a tether electrical line 44 to actuate the solenoid 20*d*. In one preferred embodiment, the solenoid applies pressure to the brake caliper, either directly or through linkages and/or levers. In another embodiment, the solenoid is coupled to a master cylinder and, in turn, a slave cylinder to compress the caliper independent of the main brake system.

Figure 7A:
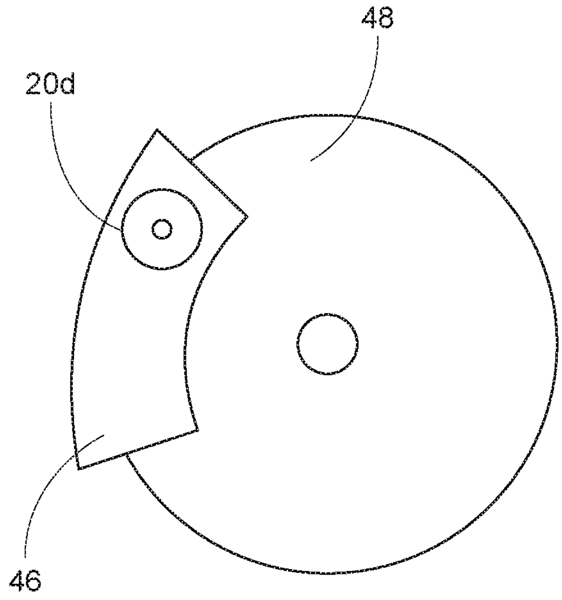
FIGS. 7A and 7B illustrate views of the brake rotor and caliper with an actuation system.
Figure 7B:
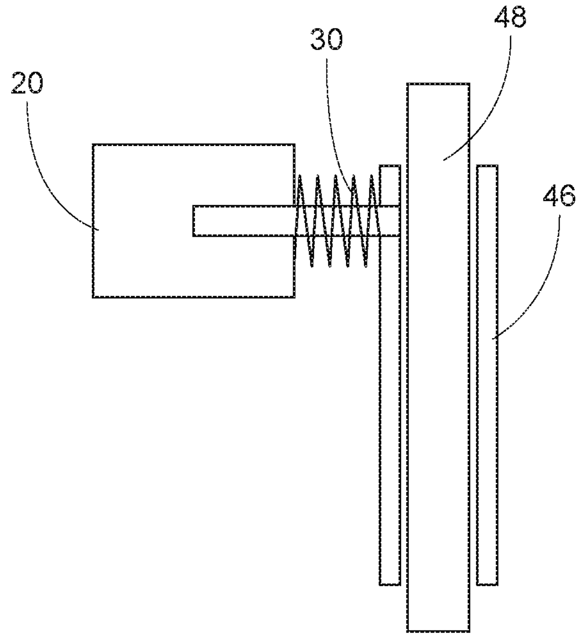

In a slight change to the embodiment of FIG. 6, FIGS. 7A and 7B schematically show a solenoid 20*d* with a resistance spring 30 biased toward pressuring the caliper 46. The solenoid 20*d* is used at the brake caliper to hold back the brake pressure. Once the proximity sensor is activated (or the tether is pulled) the voltage energizing the solenoid to resist the spring ceases and the spring presses the calipers to apply braking friction. This system can also be used independent of the standard, user-operated braking system. Besides operation as an emergency brake, it can operate as a parking brake as the system activates when the power to the ignition is switched off.

Figure 8:
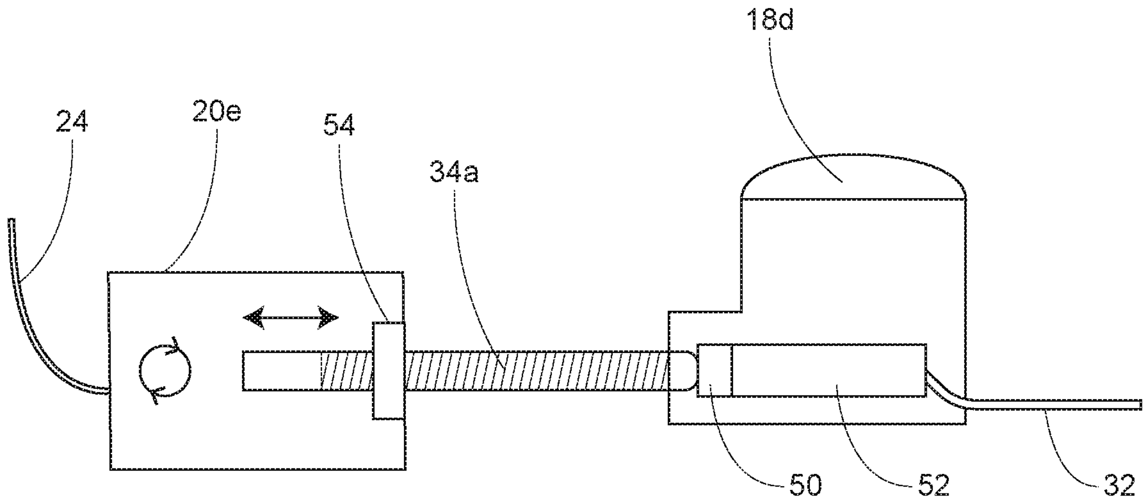
FIG. 8 is a schematic view of a vehicle braking system with screw-drive actuation.

As shown in FIG. 8, a plunger 50 compressing brake fluid in a cylinder 52 of the master cylinder 18*d* may be driven by other means than a standard solenoid. In this example, a screw drive pushes the plunger into the master cylinder. The threaded rod 34*a* is engaged with a drive nut 54 within the actuator servo 20*e*. The speed and leverage of application can be determined by the pitch of the threads on the screw drive as well as by the speed applied to the drive through a rheostat or other controller device to slow or speed up application of the brake. The screw-drive system may be used in any of the embodiments described herein in place of a standard solenoid or other actuation mechanism.

Figure 9:
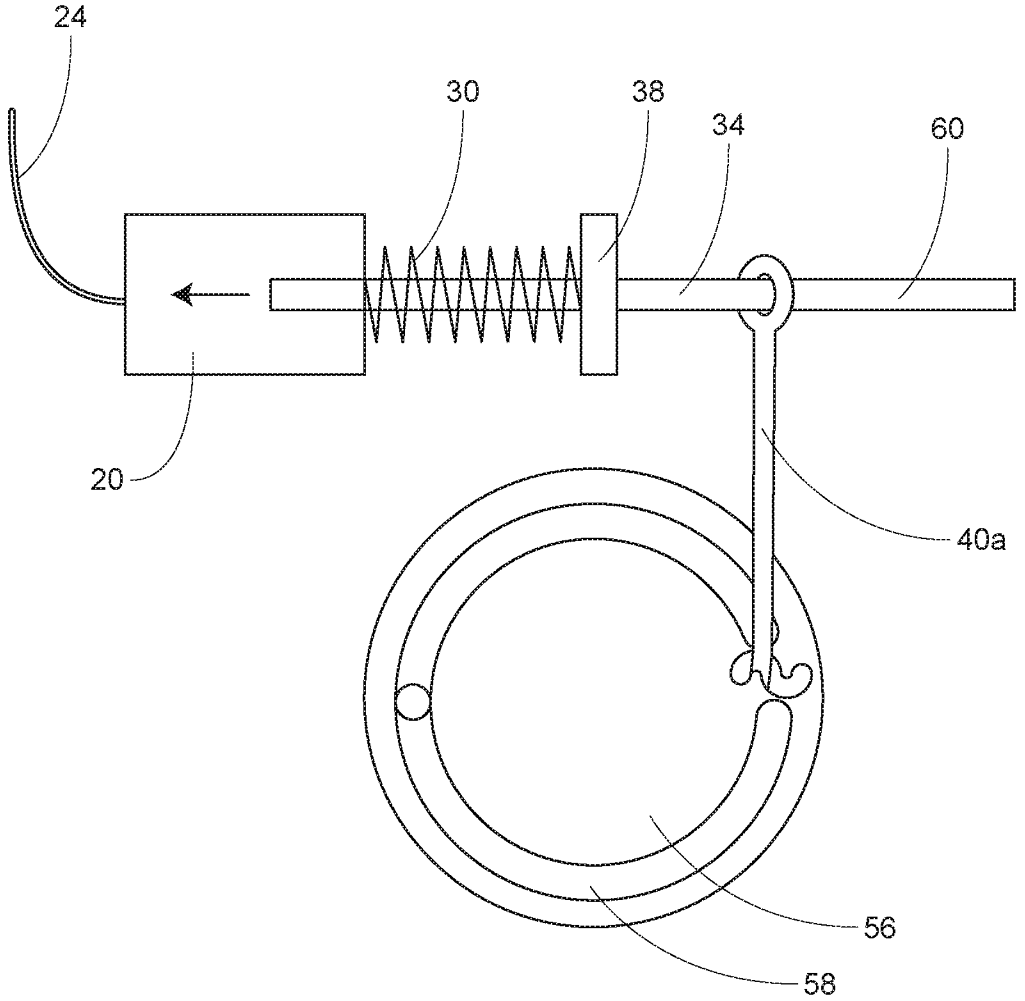
FIG. 9 is a schematic view of a drum brake braking system.

A drum brake version is schematically shown in FIG. 9. All parts of the system are not illustrated. However, the solenoid 20 is keeps the spring retracted during normal operation of the vehicle. When power is interrupted, solenoid 20 releases spring 30 to move the brake lever 40*a* into a position pressuring the drum brake 56 pads 58 against the sides of the drum. Note that the cable 60 extends to the manual lever for normal brake actuation. The solenoid 20, rod 34, spring 30, and adjustment nut 38 are added to the standard drum brake system for the separation brake of the present invention.

We claim:

1. A vehicle brake comprising:

a proximity device sensitive to the proximity of a rider to the vehicle;

a brake actuator for applying a braking force to a vehicle drive member;

a switch triggered by the proximity device providing an activation signal to the brake actuator upon a determination of a pre-set proximity threshold being crossed;

a brake master cylinder holding brake fluid, wherein the brake actuator comprises a solenoid coupled to the brake master cylinder, the solenoid coupled to a plunger in the master cylinder;

a brake caliper with a slave cylinder;

a brake line between the master cylinder and the slave cylinder, the slave cylinder for applying braking pressure to a friction device in the vehicle drive system, the slave cylinder being in fluid communication with the brake line;

a brake rotor engageable by the friction device;

a spring coupled to a rod of the solenoid for biasing the rod into the master cylinder, the rod being coupled to a master cylinder plunger, power provided to the solenoid tending to resist the spring bias such that when power to the solenoid is stopped, the spring pushes the rod into the master cylinder.

2. The brake of claim 1, wherein the vehicle includes a user-operated brake lever coupled to the brake master cylinder, the lever applying a pressure in the same brake master cylinder as the spring, the lever applying a braking force to the vehicle in normal operation.

3. The brake of claim 1, further comprising a lever coupled between the solenoid and the plunger to increase the force applied to the plunger by the solenoid.

4. The brake of claim 1, further comprising an adjustment member for adjusting a preload on the spring.

5. The brake of claim 1, further comprising a power source coupled to the solenoid, the power source being at least one of a battery and a capacitor.

6. The brake of claim 1, wherein:

the master cylinder is an in-line master cylinder in fluid communication with the brake line, the in-line master cylinder including a plunger to apply pressure to the brake fluid; and wherein the brake actuator is coupled to drive the plunger.

7. The brake of claim 1, wherein the brake actuator is positioned proximate to the friction brake member.

8. The brake of claim 1, wherein the proximity device comprises a tether for coupling between the rider and the vehicle, the tether stopping the vehicle engine ignition when pulled from a coupling to the vehicle.

9. The brake of claim 1, wherein the proximity device comprises a proximity sensor measuring a distance between the vehicle and a rider.

10. An automatic brake for a vehicle having an internal combustion engine, the brake comprising:

a brake actuator for applying a braking force to a vehicle drive member, the brake actuator comprising a spring biasing a rod to activate a friction brake, the spring being held from moving the rod by a solenoid while the engine is running; and a switch providing an activation signal to the brake actuator upon stoppage of engine ignition, stoppage of the engine stopping power to the solenoid.

11. The brake of claim 10, wherein the vehicle also includes a user-operated brake, the automatic brake having an activation mechanism separate from the user-operated brake.

12. The brake of claim 11, wherein the activation mechanism applies a braking force directly to a brake caliper.

13. The brake of claim 10, wherein the engine ignition is cut and the brake is applied upon the event of a rider being separated from the vehicle by a pre-determined distance.

14. The brake of claim 10, further comprising an adjustment member for changing the preload of the spring.

15. The brake of claim 10, wherein the brake actuator includes a master cylinder and a slave cylinder and wherein the solenoid includes a rod coupled to a plunger of the master cylinder, the coupling including a lever to increase the mechanical advantage of the movement of the solenoid rod.

* * * * *